United States Patent
Martinez Minguito

(10) Patent No.: US 11,290,908 B2
(45) Date of Patent: Mar. 29, 2022

(54) RADIO NODE, WIRELESS DEVICE, ACCESS NETWORK NODE, AND METHODS PERFORMED THEREIN

(71) Applicant: Telefonaktiebolaget LM Ericsson (publ), Stockholm (SE)

(72) Inventor: Julio Martinez Minguito, Älvsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 52 days.

(21) Appl. No.: 16/321,662

(22) PCT Filed: Aug. 3, 2016

(86) PCT No.: PCT/SE2016/050737
§ 371 (c)(1),
(2) Date: Jan. 29, 2019

(87) PCT Pub. No.: WO2018/026318
PCT Pub. Date: Feb. 8, 2018

(65) Prior Publication Data
US 2020/0128428 A1    Apr. 23, 2020

(51) Int. Cl.
*H04W 28/02* (2009.01)
*H04W 4/60* (2018.01)
(Continued)

(52) U.S. Cl.
CPC ......... *H04W 28/0247* (2013.01); *H04W 4/60* (2018.02); *H04W 24/02* (2013.01);
(Continued)

(58) Field of Classification Search
CPC ............. H04W 24/02; H04W 28/0247; H04W 28/0268; H04W 28/08; H04W 48/18; H04W 4/60; H04W 72/048
(Continued)

(56) References Cited

U.S. PATENT DOCUMENTS 8,908,664 B2* 12/2014 Caldwell ............... H04W 48/18
                                                         370/338
10,237,217 B1* 3/2019 Reeves ................ H04L 51/063
(Continued)

FOREIGN PATENT DOCUMENTS

EP        2391179 A1    11/2011

OTHER PUBLICATIONS

Author Unknown, "Technical Specification Group Services and System Aspects; General Packet Radio Service (GPRS) enhancements for Evolved Universal Terrestrial Radio Access Network (E-UTRAN) access (Release 13)," Technical Specification 23.401, Version 13.4.0, 3GPP Organizational Partners, Sep. 2015, 334 pages.
Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," Technical Specification 36.300, Version 13.1.0, 3GPP Organizational Partners, Sep. 2015, 254 pages.
(Continued)

*Primary Examiner* — Robert J Lopata
(74) *Attorney, Agent, or Firm* — Withrow & Terranova, PLLC

(57) ABSTRACT

Embodiments herein relate to a method performed by a radio node for handling provision of a service to a wireless device in a wireless communication network. The wireless communication network comprises an access network node serving the radio node over a connection. The radio node transmits an indication to the wireless device, which indication indicates type and/or capacity, for the wireless device or the radio node, of the connection between the radio node and the access network node.

21 Claims, 11 Drawing Sheets

(51) Int. Cl.
    *H04W 24/02*    (2009.01)
    *H04W 28/08*    (2009.01)
    *H04W 48/18*    (2009.01)
    *H04W 72/04*    (2009.01)
(52) U.S. Cl.
    CPC ....... *H04W 28/0268* (2013.01); *H04W 28/08* (2013.01); *H04W 48/18* (2013.01); *H04W 72/048* (2013.01)
(58) Field of Classification Search
    USPC .......................................................... 370/329
    See application file for complete search history.

(56) References Cited

U.S. PATENT DOCUMENTS

| | | | | |
|---|---|---|---|---|
| 2012/0002614 | A1* | 1/2012 | Ekici | H04W 28/24 370/329 |
| 2012/0176962 | A1* | 7/2012 | Kimura | H04L 1/0003 370/315 |
| 2013/0102313 | A1* | 4/2013 | Tinnakornsrisuphap | H04W 36/22 455/436 |
| 2013/0336227 | A1* | 12/2013 | Cho | H04W 76/15 370/328 |
| 2014/0098671 | A1 | 4/2014 | Raleigh et al. | |
| 2014/0233430 | A1* | 8/2014 | Russell | H04M 11/08 370/259 |
| 2014/0370893 | A1 | 12/2014 | Srikrishna et al. | |
| 2014/0376403 | A1* | 12/2014 | Shao | H04W 4/60 370/254 |
| 2015/0038159 | A1* | 2/2015 | Fang | H04W 48/20 455/452.2 |
| 2016/0182134 | A1* | 6/2016 | Kol | H04J 11/0023 370/329 |
| 2016/0205592 | A1* | 7/2016 | Koskinen | H04W 28/08 370/230 |
| 2017/0048782 | A1* | 2/2017 | Choi | H04B 7/0404 |
| 2017/0127330 | A1* | 5/2017 | Payyappilly | H04W 36/0061 |
| 2017/0303332 | A1* | 10/2017 | Yuan | H04W 76/15 |
| 2017/0374690 | A1* | 12/2017 | Maddali | H04W 24/02 |
| 2018/0049112 | A1* | 2/2018 | Wang | H04L 43/10 |
| 2018/0199270 | A1* | 7/2018 | Krishnan | H04W 76/15 |
| 2018/0199274 | A1* | 7/2018 | Krishnan | H04W 48/16 |
| 2018/0270696 | A1* | 9/2018 | Duan | H04W 48/02 |
| 2018/0343608 | A1* | 11/2018 | Duan | H04W 48/20 |
| 2020/0029200 | A1* | 1/2020 | Yu | H04W 8/065 |
| 2020/0077460 | A1* | 3/2020 | Hahn | H04W 76/27 |

OTHER PUBLICATIONS

Mai, Yi-Ting, et al., "IP Multimedia Relay Architectures with Multi-RAT Support in LTE-Advanced Wireless Network," 7th Asia Modelling Symposium, IEEE Computer Society, 2013, pp. 283-288.

Pediaditakis, Dimosthenis, et al., "Verifying Home Network Bandwidth Sharing Plans," 7th International Conference on Network and Service Management, Paris, 2011, 9 pages.

Kuan, Yifei, "LTE-Advanced Relay Technology and Standardization," Sections 3.1.3-3.2, 4.1, and 7.4-7.5, Springer Berlin Heidelberg, Jul. 25, 2012, XP002768991, ISBN: 9783642296758; pp. 41-43, 91, and 184-185.

International Search Report and Written Opinion for International Patent Application No. PCT/SE2016/050737, dated Apr. 24, 2017, 16 pages.

* cited by examiner

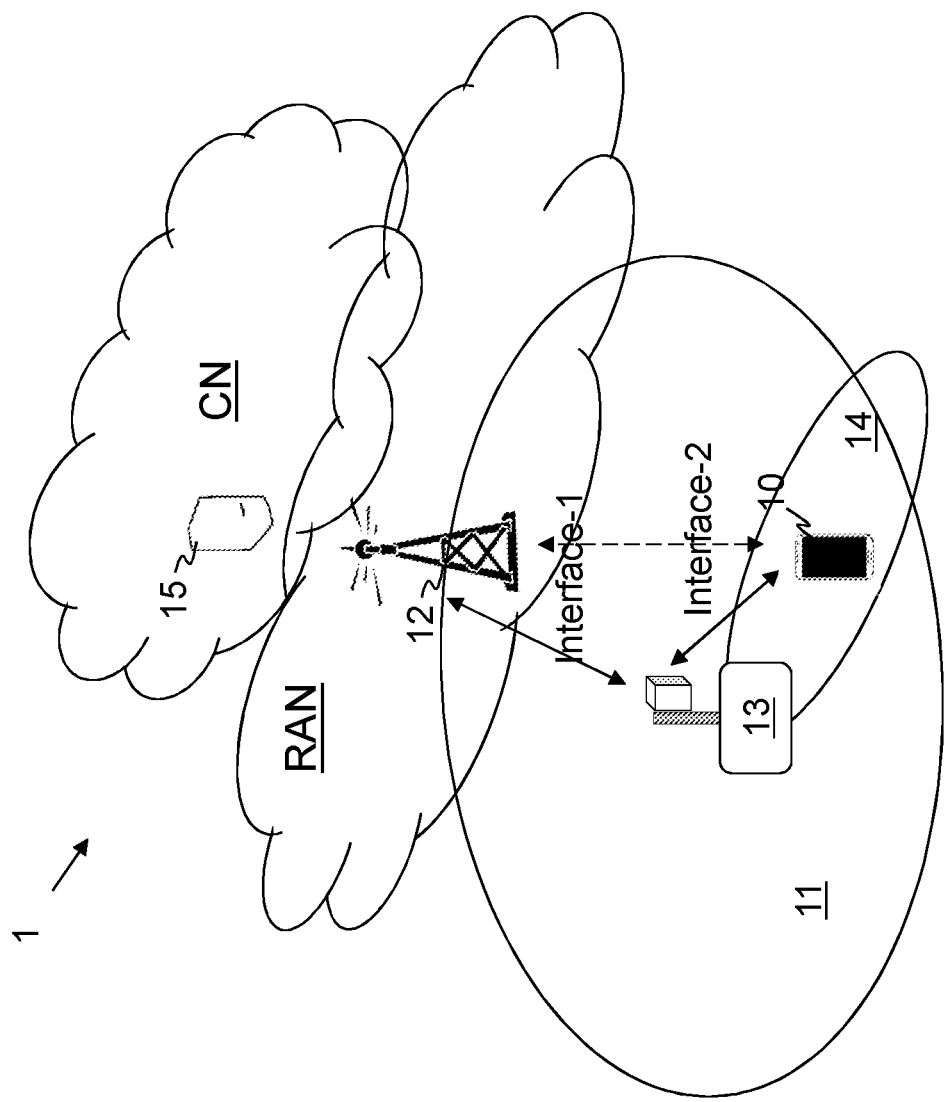

RADIO NODE, WIRELESS DEVICE, ACCESS NETWORK NODE, AND METHODS PERFORMED THEREIN

This application is a 35 U.S.C. § 371 national phase filing of International Application No. PCT/SE2016/050737, filed Aug. 3, 2016, the disclosure of which is incorporated herein by reference in its entirety.

TECHNICAL FIELD

Embodiments herein relate to a radio node, a wireless device, an access network node, and methods performed therein. In particular embodiments herein relate to handling a service or provision of a service in a wireless communication network.

BACKGROUND

In a typical wireless communication network, wireless devices, also known as wireless communication devices, mobile stations, stations (STA) and/or user equipments (UE), communicate via an Access Network such as a radio access network (RAN) to one or more core networks (CN). The access network covers a geographical area which is divided into service areas or cell areas, with each service area or cell area being served by an access network node such as an access point e.g. a Wi-Fi access point or a radio access network node such as a radio network node e.g. a radio base station (RBS), which in some networks may also be denoted, for example, a "NodeB" or "eNodeB". A service area is a geographical area where radio coverage is provided by the access network node. The access network node communicates over an air interface operating on radio frequencies with the wireless device within range of the access network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several access network nodes may be connected, e.g., by landlines or microwave, to a controller node, such as a radio network controller (RNC) or a base station controller (BSC), which supervises and coordinates various activities of the plural access network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3$^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the access network nodes are directly connected to the EPC core network rather than to RNCs. In general, in E-UTRAN/LTE the functions of an RNC are distributed between the access network nodes, e.g. eNodeBs (eNB) in LTE, and the core network. As such, the RAN of an EPS has an essentially "flat" architecture comprising access network nodes connected directly to one or more core networks, i.e. they are not connected to RNCs. To compensate for that, the E-UTRAN specification defines a direct interface between the radio network nodes, this interface being denoted the X2 interface. EPS is the Evolved 3GPP Packet Switched Domain. FIG. 1 is an overview of the EPC architecture. This architecture is defined in 3GPP TS 23.401 v.13.4.0 wherein a definition of a Packet Data Network Gateway (P-GW), a Serving Gateway (S-GW), a Policy and Charging Rules Function (PCRF), a Mobility Management Entity (MME) and a wireless or mobile device (UE) is found. The LTE radio access, E-UTRAN, comprises one or more eNBs. FIG. 2 shows the overall E-UTRAN architecture and is further defined in for example 3GPP TS 36.300 v.13.1.0. The E-UTRAN comprises eNBs, providing a user plane comprising the protocol layers Packet Data Convergence Protocol (PDCP)/Radio Link Control (RLC)/Medium Access Control (MAC)/Physical layer (PHY), and a control plane comprising Radio Resource Control (RRC) protocol in addition to the user plane protocols towards the wireless device. The radio network nodes are interconnected with each other by means of the X2 interface. The radio network nodes are also connected by means of the S1 interface to the EPC, more specifically to the MME by means of an S1-MME interface and to the S-GW by means of an S1-U interface.

Wireless devices such as smart telephones and tables can connect to internet or data networks using Wi-Fi access or mobile network access such as LTE, UMTS, or similar. The Wi-Fi Alliance defines Wi-Fi as a wireless local area network (WLAN) product based on the Institute of Electrical and Electronics Engineers' (IEEE) 802.11 standards. Wi-Fi compatible wireless devices connect to the Internet via a WLAN network and a Wi-Fi access point being an example of an access network node. Wi-Fi access usually has unlimited data as a Wi-Fi router is connected to e.g. a home Asymmetric Digital Subscriber Line (ADSL) or Fiber access which have unlimited data, while access via mobile network access usually has a limited quota of data e.g. monthly quota depending on the subscription, e.g. 500 MB, 1 GB, 2 GB, etc.

Wireless devices usually prefer connection via WiFi than via mobile network such as 3G/4G/5G, e.g. at home the phone connects via the configured WiFi network rather than the mobile network. Furthermore, wireless devices allow configuring policies for data usage depending on the access technology used, thus applications or functions with heavy data usage, e.g. backup, update of software (SW), etc., can be restricted to only transfer data when connected via Wi-Fi to save data from a subscription of a mobile subscription with a limited quota of data. Thus, as soon as the wireless device connects to a WiFi network the policy or policies for a WiFi connection are used and after leaving and connecting to a mobile network policy or policies for a mobile network are used.

It is a common solution to have 3G/4G routers with a mobile broadband subscription that provide WiFi access to wireless devices. This is commonly used when people are away from their usual residences, e.g. on vacation. A subscription with the limited quota of data may then be used by several wireless devices and these will drain the quota of data rapidly leading to lower speeds due to high speed quota exceeded, extra expensive charges for the users based on data consumption per day, depending on operators model, and thus a limited experienced performance of the wireless communication network for the user of the wireless device.

SUMMARY

An object of embodiments herein is to provide a mechanism for handling a service or provision of a service in the wireless communication network in an improved manner.

According to an aspect the object is achieved by providing a method performed by a radio node for handling provision of a service to a wireless device in a wireless communication network. The wireless communication network comprises an access network node serving the radio node over a connection. The radio node transmits an indication to the wireless device, which indication indicates type and/or capacity, for the wireless device or the radio node, of the connection between the radio node and the access network node, e.g. the indication may indicate whether there is a limitation of quota of data associated to the connection.

According to another aspect the object is achieved by providing a method performed by a wireless device for handling data communication of a service in a wireless communication network. The wireless communication network comprises a radio node and an access network node serving the radio node over a connection. The wireless device receives an indication from the radio node or from the access network node, which indication indicates type and/or capacity, for the wireless device or the radio node, of the connection between the radio node and the access network node or a connection between the wireless device and the access network node. The wireless device further applies a policy regarding data communication of the service based on the received indication.

According to yet another aspect the object is achieved by providing a method performed by an access network node for handling provision of a service to a wireless device in a wireless communication network. The access network node transmits an indication to the wireless device or a radio node, which indication indicates type and/or capacity, for the wireless device or the radio node, of a connection between the radio node and the access network node or a connection between the wireless device and the access network node.

According to still another aspect the object is achieved by providing a radio node for handling provision of a service to a wireless device in a wireless communication network. The wireless communication network comprises an access network node serving the radio node over a connection. The radio node is configured to transmit an indication to the wireless device, which indication indicates type and/or capacity, for the wireless device or the radio node, of the connection between the radio node and the access network node.

According to still yet another aspect the object is achieved by providing a wireless device for handling data communication of a service in a wireless communication network. The wireless communication network comprises a radio node and an access network node serving the radio node over a connection. The wireless device is configured to receive an indication from the radio node or the access network node, which indication indicates type and/or capacity, for the wireless device or the radio node, of the connection between the radio node and the access network node or a connection between the wireless device and the access network node. The wireless device is further configured to apply a policy regarding data communication of the service based on the received indication.

According to another aspect the object is achieved by providing an access network node for handling provision of a service to a wireless device in a wireless communication network. The access network node is configured to transmit an indication to the wireless device or a radio node, which indication indicates type and/or capacity, for the wireless device or the radio node, of a connection between a radio node and the access network node or a connection between the wireless device and the access network node.

It is furthermore provided herein a computer program comprising instructions, which, when executed on at least one processor, cause the at least one processor to carry out any of the methods above, as performed by the radio node, the access network node, or the wireless device. It is additionally provided herein a computer-readable storage medium, having stored thereon a computer program comprising instructions which, when executed on at least one processor, cause the at least one processor to carry out the method according to any of the methods above, as performed by the radio node, the access network node, or the wireless device.

Embodiments herein introduce an efficient solution providing a radio node or an access network node that indicates the type and/or capacity, for the wireless device or the radio node, of the connection, and the wireless device then applies a policy regarding communication or usage of the service based on the received indication. For example, if the indication indicates a type or capacity of the connection for the wireless device/radio node associated with a limitation of quota of data the wireless device may apply one policy of communication for the service, and if not, the wireless device may apply a different policy of communication for the service. Thus, embodiments herein provides a solution to handles provision of a service in a resource efficient manner without e.g. draining quota of data for the wireless device.

BRIEF DESCRIPTION OF THE DRAWINGS

Embodiments will now be described in more detail in relation to the enclosed drawings, in which:

FIG. 3 is a schematic overview depicting a wireless communication network according to embodiments herein;

DETAILED DESCRIPTION

Figure 1:
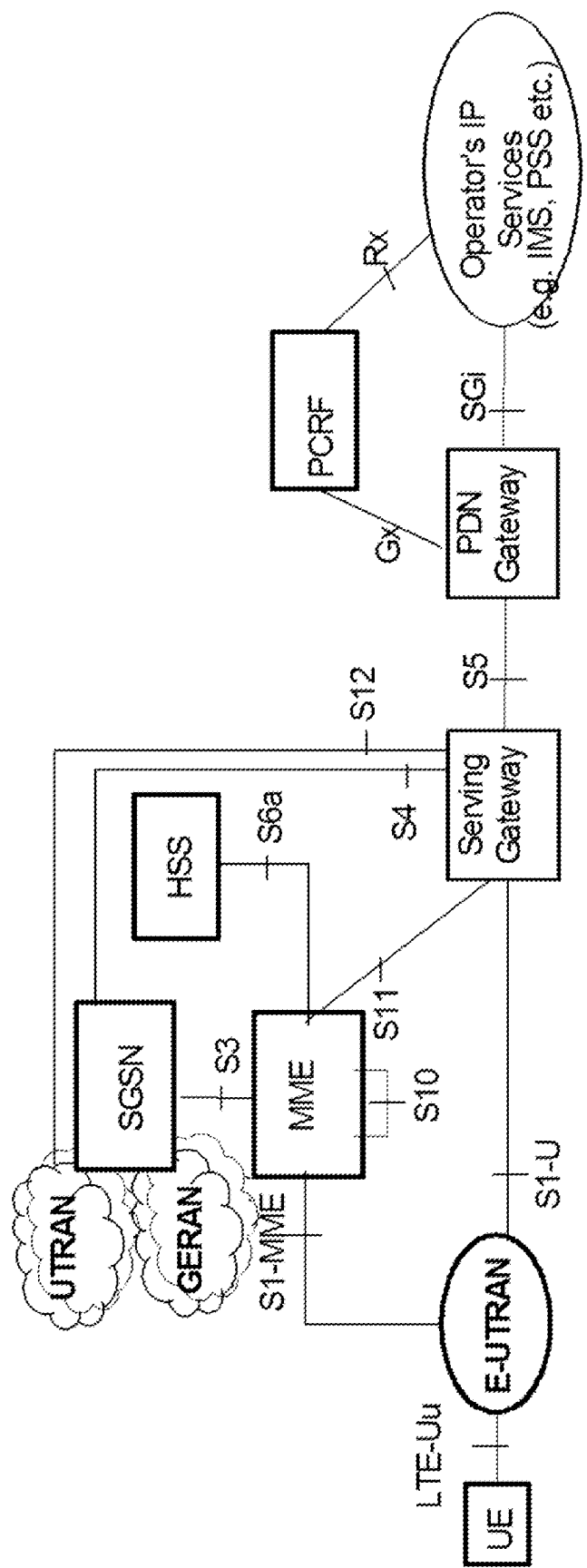
FIG. 1 is a schematic overview depicting an EPC architecture according to prior art.
Figure 2:
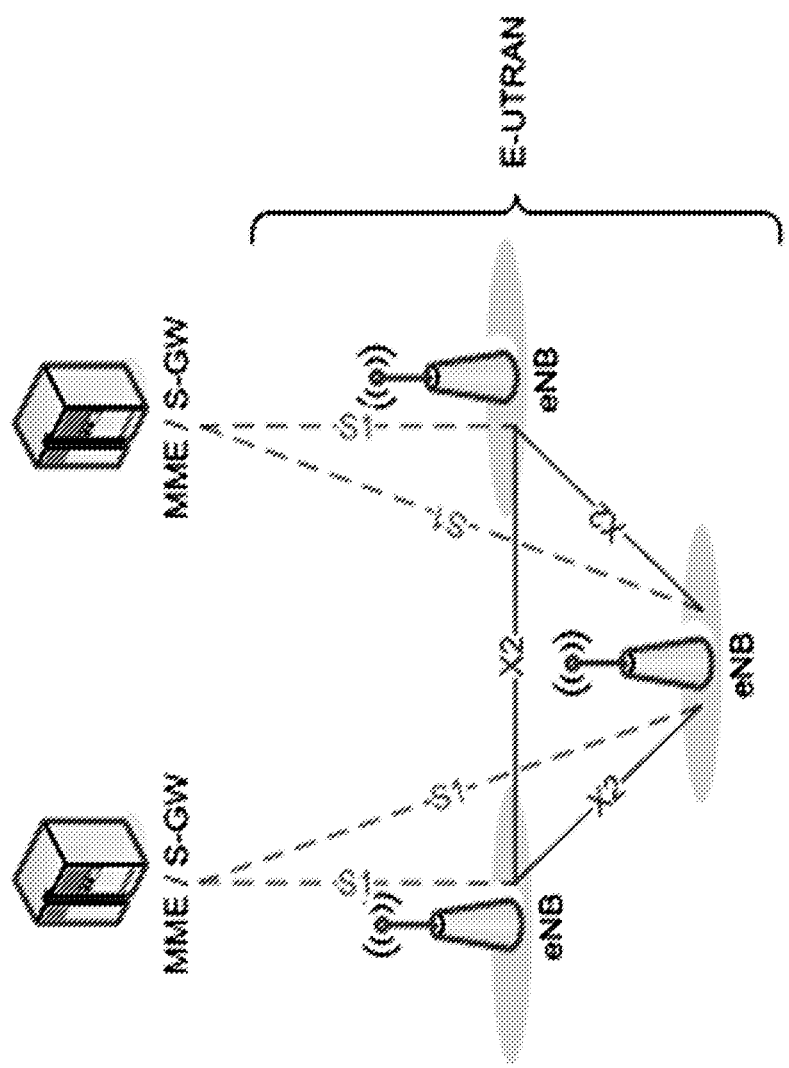
FIG. 2 is a schematic overview depicting an E-UTRAN in connection with a core network.

Embodiments herein relate to wireless communication networks in general. FIG. 3 is a schematic overview depicting a wireless communication network 1. The wireless communication network 1 comprises one or more RANs and one or more CNs. The wireless communication network 1 may use a number of different technologies, such as Wi-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

In the wireless communication network 1, wireless devices e.g. a wireless device 10 such as a mobile station, a non-access point (non-AP) Station (STA), a STA, a user equipment and/or a wireless terminals, communicate via one or more Access Networks (AN), e.g. RAN, to one or more CN or directly with one another. It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, temperature sensor, robot device, relay, mobile tablets or even a small base station communicating within a cell or similar.

The wireless communication network 1 comprises an access network node 12 providing radio coverage over a geographical area, a first service area 11, of a first radio access technology (RAT), such as LTE, UMTS or similar. The access network node 12 may be a transmission and reception point e.g. a radio network node such as a base station e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the area served by the access network node 12 depending e.g. on the first radio access technology and terminology used. The access network node 12 may be referred to as a serving access point and communicates with wireless devices and radio nodes with DL transmissions to the wireless devices and radio nodes, and UL transmissions from the wireless devices or the radio nodes.

According to embodiments herein the wireless communication network 1 further comprises a radio node 13, which radio node 13 provides radio coverage over a geographical area, a second service area 14, of a second RAT, such as LTE, WiMAX or similar over the allocated radio resources. The radio node 13 may be a transmission and reception point e.g. a radio network node such as a wireless gateway, a Wireless Local Area Network (WLAN) access point or an Access Point Station (AP STA), an access controller, a wireless device, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the area served by the radio node 13 depending e.g. on the second radio access technology and terminology used. The first and second RAT may be different RATs and the radio node 13 may be gateway providing a transition from the first and second RAT as transport. It should be noted that a service area may the denoted as 'cell', beam, beam group, or similar to define an area of radio coverage, and that the second area 14 may be completely included under the first area or at least partly covered, it may just provide another access/transport protocols, e.g. provides WiFi access to wireless devices which do not have 3G/4G/5G capabilities or in addition to 3G/4G/5G.

Services and applications may be provided from a network node 15 in the core network or internet. The network node 15 may be an internet server or similar.

To the network e.g. the access network node 12 or CN nodes, the radio node 13 may be operated as a wireless device and the radio node 13 may communicate with the access network node 12 over a connection using radio resources allocated by the access network node 12 based on a wireless network protocol. To all the wireless devices, such as the wireless device 10, served by the radio node 13, the radio node 13 is operating as a scheduler/controller to further allocate radio resources to the communications of the wireless devices. Thus, the radio node 13 communicates with the access network node 12 over the connection which may be a wireless interface, denoted a first radio interface or Interface-1, and the wireless device 10 is communicating with the radio node 13 over an interface between the radio node 13 and the wireless device 10 denoted as the second radio interface or interface-2. Different radio interface protocol may be used at these interfaces and the radio node 13 may function e.g. as a protocol converter, a gateway or a relay, which potentially is programmable and may convert any air interface protocol within commercial wireless network licensed band. The first radio interface Interface-1 may follow a wireless network air interface protocol, such as LTE air interface protocol and the second radio interface Interface-2 may be using a different frequency band or sharing the same frequency band, or at least a part, as the first radio interface but can be programmable as any protocol based on customer needs. For example, it could be a radio interface protocol such as a Wi-Fi protocol, or a 5G protocol.

As stated above in the background, wireless devices allow configuring policies for data usage depending on the access technology used. Thus applications or functions with heavy data usage, e.g. backup, update of software (SW), etc., can be restricted to only transfer data when connected via an access technology such as Wi-Fi to save data from a subscription of another access technology with a limited quota of data e.g. a mobile subscription, and not to transfer data when connected via the other access technology such as 3G/4G which may use a mobile subscription with a limited quota of data. It is a common solution to have 3G/4G routers with a mobile broadband subscription that provide Wi-Fi access to wireless devices. The wireless devices see the connection as a Wi-Fi connection with no limited quota of data, and perform operations consuming heavy amount of data, which causes that the quota of the subscription is consumed in a few days, or even hours.

To avoid this situation, the users of the wireless devices have to change one or more policies on their wireless devices to not allow e.g. background data backups or updates. This is tedious and complicated, as this is to be configured separately for different applications and different applications have different menus to control this. Furthermore, when the users return to their home network, the users have to change the configuration of their wireless device back again to allow transfers via e.g. WiFi.

According to embodiments herein the wireless device 10 receives an indication from the radio node 13 when connecting to the radio node 13, e.g. over WiFi signaling, or from the access network node 12 over 3GPP signaling. This may occur when the wireless device 10 is already connected to the access network node 12 indicated by the dashed arrow. The indication indicates type and/or capacity, for the wireless device 10 or the radio node 13, of a connection between the radio node 13/wireless device 10, and the access network node 12, and the indication controls the configuration of policies in the wireless device 10. It should be noted that the connection is shown as a wireless connection but may be a wired connection. The indication may e.g. include information about if the data access, i.e. the connection, is via a wireless network, thus allowing the policies on the wireless device 10 act not just on WiFi or not, but on whether the real data access i.e. the connection is mobile or not, thus saving data from the quota. As stated above the indication may indicate capacity, of the connection, for the wireless device or capacity, of the connection, for the radio node 13 e.g. a quota of data of a subscription of the wireless device or a quota of data of a subscription of the radio node 13. The radio node 13 may have an identity module, e.g. Subscriber Identity Module (SIM) or Universal Integrated Circuit Card (UICC) card, for the associated subscription enabling a mobile connection to the wireless communication network using the first RAT. The subscription may or may not have a quota of data, thus the indication may be configurable in the radio node 13 to indicate to the wireless devices 10 if there is a limited quota of data, or if there are no limits to the amount of data that can be transmitted over the connection for the wireless device 10.

The wireless device 10 receives the indication and may then, based on the received indication, apply a policy for one or more applications, functions or services. For example, an Operation System (OS) for the wireless device 10 may be updated to recognize the received indication or indicator and to provide the proper information to the applications. Note that the applications or services of the wireless device 10 may be configured to perform heavy data transfer despite indication of quota limits, this is a user decision deciding how to use the quota.

An advantage of embodiments herein is that the subscribers do not have to modify the configuration of their wireless devices when using e.g. 3G/4G access via WiFi. Handling of policies in the wireless device 10 will be much simpler for the user of the wireless device 10 and the end user satisfaction will further be better, and frustration of seeing data of a subscription being consumed in a short time will be reduced.

Figure 4A:
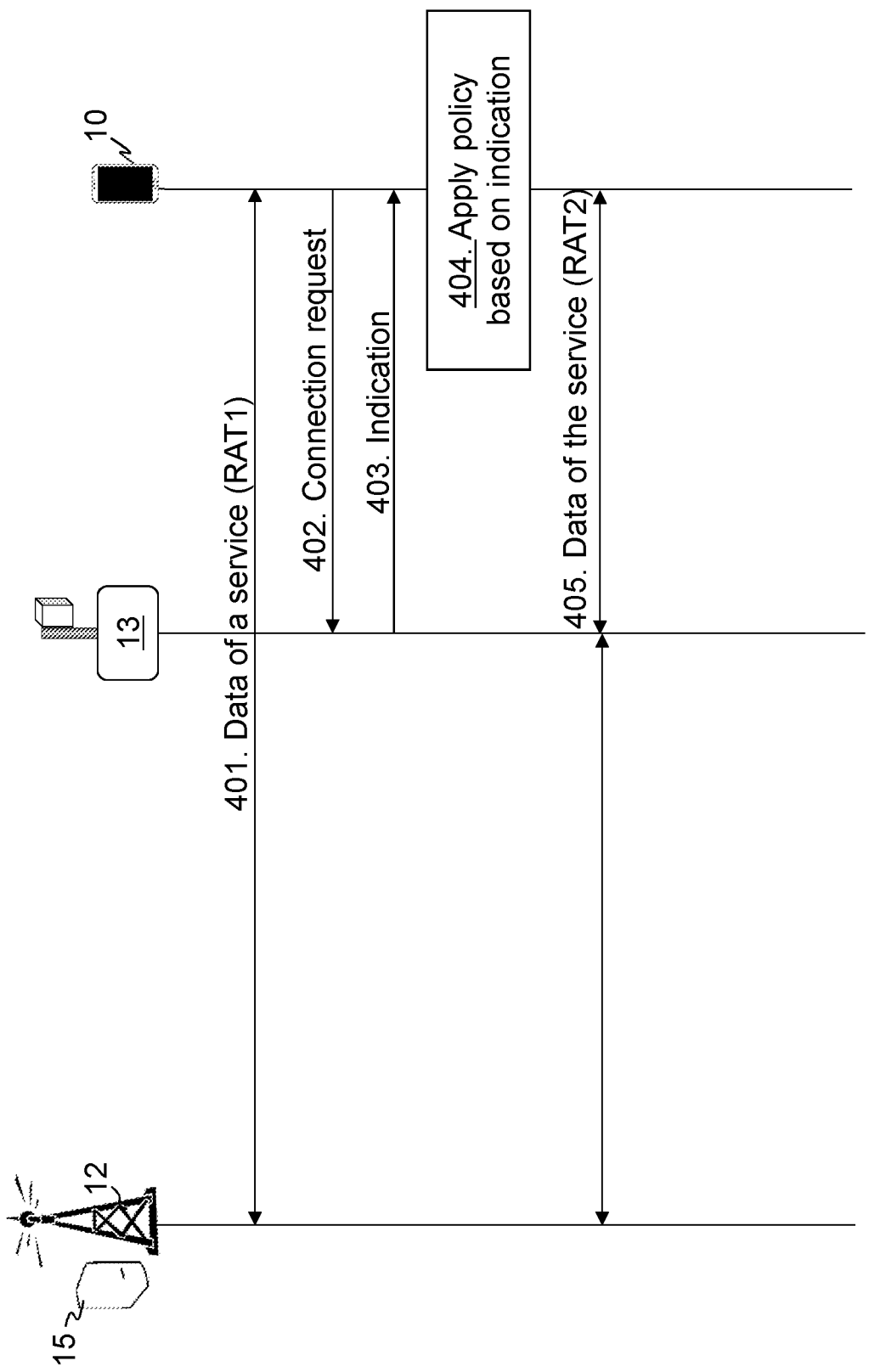
FIG. 4a is a combined flowchart and signaling scheme according to embodiments herein.

FIG. 4a is a combined flowchart and signaling scheme according to embodiments herein.

Action 401. The wireless device 10 may be connected to a server 15 such as an Internet server providing a service via the access network node 12 over the first RAT. The wireless device 10 is communicating data to/from the network via the access network node 12 over the first RAT. The wireless device 10 may when being connected to the network node 12 apply a first policy for the service. In some embodiments herein not exemplified in FIG. 4a the wireless device 10 may receive from the access network node 12 the indication about e.g. data capabilities of the connection between the radio node and the access network node.

Action 402. The wireless device 10 enters the second service area 14 and detects the radio node 13 e.g. receives signals associated to the radio node 13. The wireless device 10 may then send a connection request to the radio node 13, e.g. a Wifi 802.11 request.

Action 403. The radio node 13 then responds to the connection request e.g. accepting the request and allocates resources for communication to the wireless device 10. The radio node 13 further transmits the indication informing the wireless device 10 of the type and/or capacity, for the wireless device 10 or the radio node 13, of the connection between the radio node 13 and the access network node 12. This may be added into the response of the connection request but may also be transmitted separately or even broadcasted periodically within the second service area 14 e.g. in system information signals using e.g. 802.11, Bluetooth, or 3G protocols.

Action 404. The wireless device 10 thus receives the indication and based on the received indication applies the policy regarding data communication of the service. E.g. if the indication indicates that the connection is a connection with limited capacity for the wireless device based on a quota of a subscription, the wireless device 10 may apply the same first policy as previously when being connected directly to the access network node 12. However, if the indication indicates that the connection is a connection with no limited capacity for the wireless device, e.g. being a wired connection, the wireless device 10 may apply a second policy, which second policy may be pre-configured at the wireless device e.g. with less limitations.

Action 405. The wireless device 10 then communicates with the network node 15 via the radio network node 12 using the applied policy. Thus, when the connection between the access network node 12 and the radio node 13 has e.g. a limited quota this will not be drained as rapidly and the handling of policies in wireless device 10 will be much simpler for the user since the user does not have to modify the configurations in the wireless device 10.

It should be noted that the access network node 12 may obtain information from the CN about if a subscription of the wireless device has a quota limit or not, and send a capacity indication via interface-1 towards the wireless device 10 or the radio node 13. Radio node 13 may relay the capacity indication received from the access network node 12 to the wireless device 10.

Figure 4B:
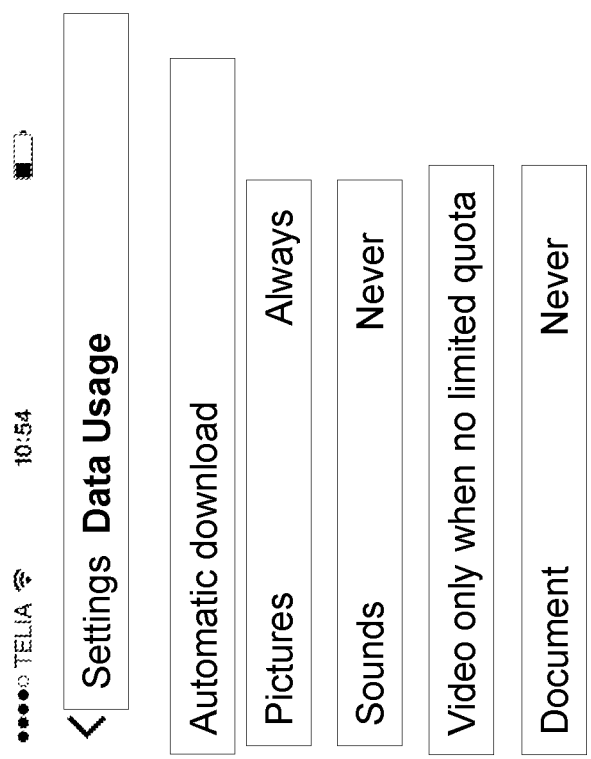
FIG. 4b is a schematic overview depicting settings of a policy applied in a wireless device.

FIG. 4b is a schematic overview depicting a graphical user interface wherein settings of a policy in the wireless device 10. The policy may indicate that pictures are always automatically downloaded, sounds and documents are never automatically downloaded and Video are automatically downloaded only when there is no limited quota of the connection.

Figure 5:
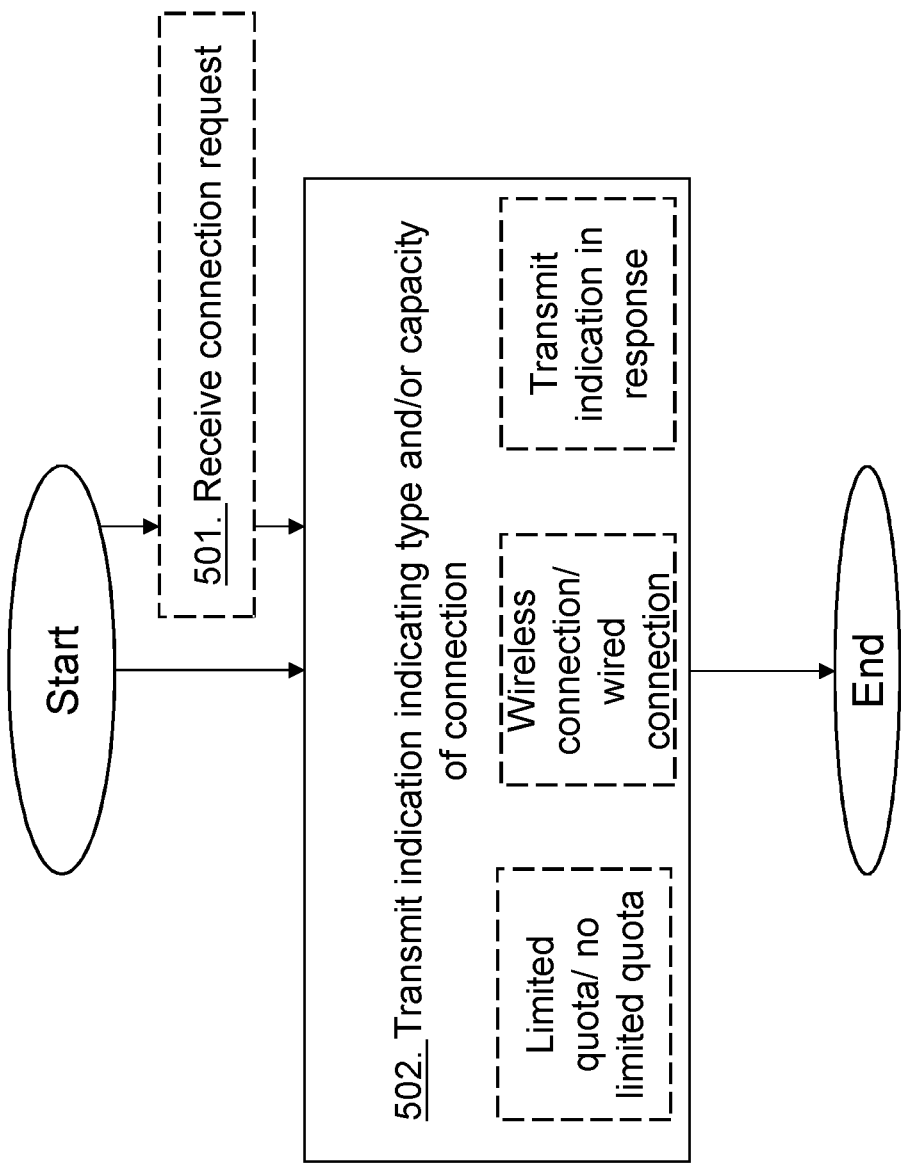
FIG. 5 is a flowchart depicting a method performed by a radio node according to embodiments herein.

The method actions performed by the radio node 13 for handling provision of the service to the wireless device 10 in the wireless communication network 1 according to some embodiments will now be described with reference to a flowchart depicted in FIG. 5. The actions do not have to be taken in the order stated below, but may be taken in any suitable order. Actions performed in some embodiments are marked with dashed boxes. The wireless communication network 1 comprises the access network node 12 serving the radio node 13 over the connection, e.g. a wired or wireless connection. The access network node 12 may provide radio coverage over the first service area 11 supporting the first RAT, and the radio node 13 may provide radio coverage over the second service area 14 supporting the second RAT. The first and second RATs may be different RATs. The first RAT may be a mobile network access and the second RAT may be a W-Fi access or a Bluetooth access. The first RAT may be using a licensed frequency band and the second RAT may be using an unlicensed frequency band; or the first RAT may be using both licensed and unlicensed frequency spectrum and the second RAT may only be using the unlicensed frequency spectrum. The radio node 13 may communicate with the access network node 12 over the connection using resources allocated by the access network node 12.

Action 501. The radio node 13 may receive a connection request from the wireless device 10. e.g. when entering the second service area 14.

Action 502. The radio node 13 transmits the indication to the wireless device, which indication indicates type and/or capacity, for the wireless device 10 or the radio node 13, of the connection between the radio node 13 and the access network node 12. The radio node 13 may receive the indication from the access network node 12 and change, add additional information to the indication or relay the indication as it was received to the wireless device 10, or the radio node 13 may add the indication based on configuration of the radio node 13. The indication may be transmitted to the wireless device 10 in a response to the connection request. The indication may indicate capacity of the connection e.g. indicate whether the radio node 13 is connected to the access network node 12 over a connection with a limited quota of data or not for the wireless device. The connection may be a wireless connection without a quota limit or with a quota limit. The indication may comprise one bit toggled between limited quota and not limited quota. Additionally or alternatively, if no indication is included in the response this indicates implicitly that there is no quota limit for the connection and full rate may be used for the second RAT such as WiFi/Bluetooth. The indication may indicate type of connection e.g. the indication may indicate whether the radio node 13 is connected to the access network node 12 over a wireless connection or a wired connection. Thus, the indication indicates whether the connection is a wireless connection or a wired connection.

Figure 6:
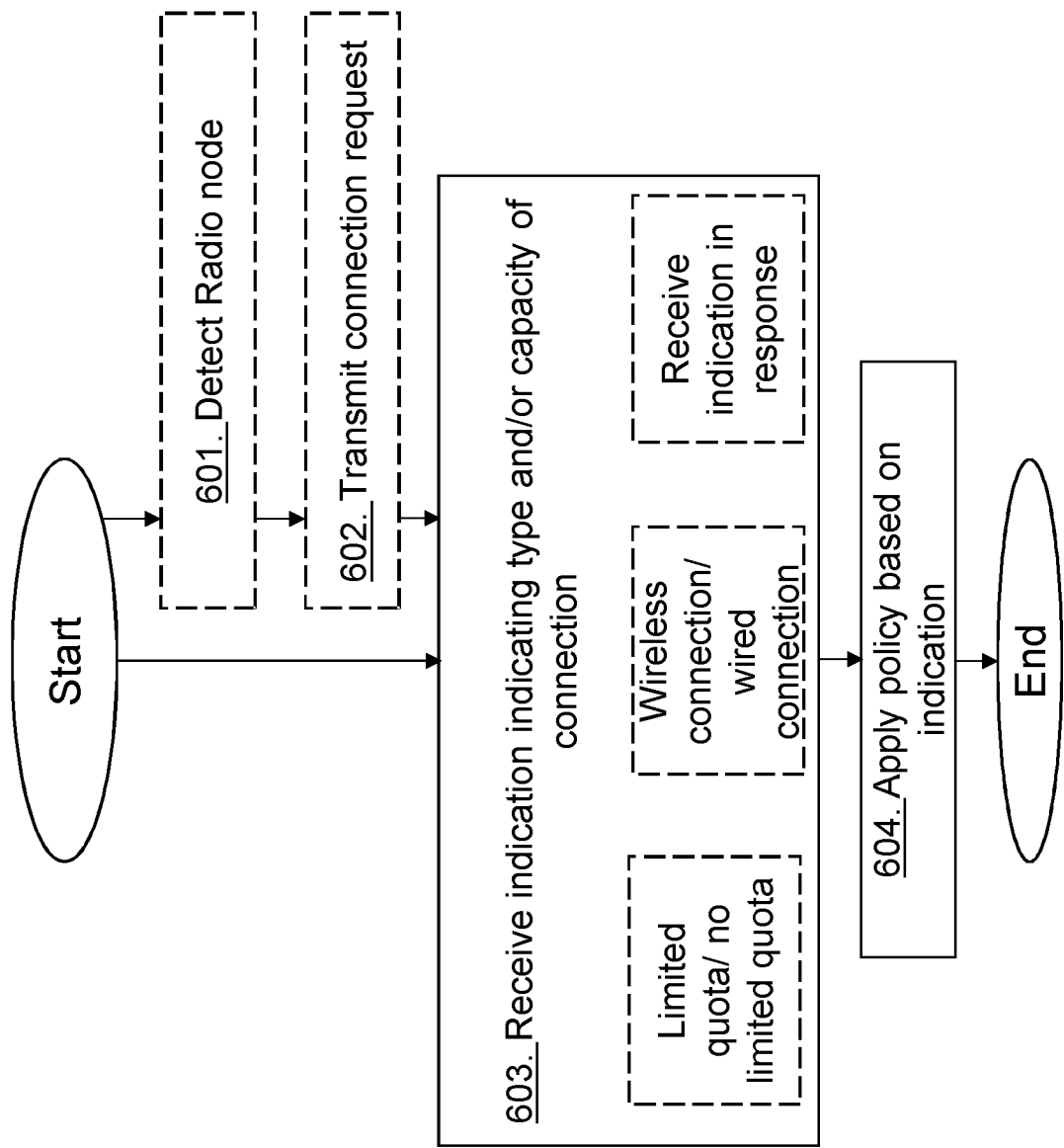
FIG. 6 is a flowchart depicting a method performed by a wireless device according to embodiments herein.

The method actions performed by the wireless device 10 for handling data communication of the service in the wireless communication network 1 according to some embodiments will now be described with reference to a flowchart depicted in FIG. 6. The actions do not have to be taken in the order stated below, but may be taken in any suitable order. Actions performed in some embodiments are marked with dashed boxes. The wireless communication network 1 comprises the radio node 13 and the access network node 12 serving the radio node 13 over the connection. The access network node 12 may provide radio coverage over the first service area 11 supporting the first RAT, and the radio node 13 may provide radio coverage over the second service area 14 supporting the second RAT. The first and second RATs may be different RATs. The first RAT may be a mobile network access and the second RAT be a Wi-Fi access or a Bluetooth access. The first RAT may be using a licensed frequency band and the second RAT may be using an unlicensed frequency band; or the first RAT may be using both licensed and unlicensed frequency spectrum and the second RAT may only be using the unlicensed frequency spectrum. The radio node 13 may communicate with the access network node 12 over the connection using resources allocated by the access network node 12.

Action 601. The wireless device 10 may, when the wireless device 10 is connected to the first RAT, detect the radio node 13.

Action 602. The wireless device 10 may transmit the connection request to the radio node 13. This may performed upon entering the second service area 14.

Action 603. The wireless device 10 receives the indication from the radio node 13 or the access network node 12, which indication indicates type and/or capacity, for the wireless device 10 or the radio node 13, of the connection between the radio node 13 and the access network node 12 or a connection between the wireless device 10 and the access network node 12. The indication may indicate whether the radio node 13 or the wireless device 10 is connected to the access network node 12 over a connection with a limited quota of data or not. The indication may indicate whether the radio node 13 is connected to the access network node 12 over a wireless connection or a wired connection. The indication may be received from the radio node 13 as a response to the connection request.

Action 604. The wireless device 10 applies the policy regarding data communication of the service based on the received indication. E.g. the wireless device may apply a first policy when the indication indicates that the connection has no quota limit, and a second policy when the indication indicates that the connection has a quota limit.

It should be noted that the wireless device 10 may receive the indication from the access network node 12 e.g. before connecting to the radio node 13. Thus, the indication, being denoted as a capacity indication, may be associated to the radio node 13 e.g. mapped to an identity of the radio node 13 or to a subscription of the wireless device 10 or the radio node 13. The wireless device 10 may then use the capacity indication from the access network node 12 to apply a policy or select a policy based on the capacity indication. Hence, policy or polices are applied based on the indication/capacity indication. Policy setting may be "always-on"; "only when unlimited quota" and "never". For backwards compatibility, current apps based on whether the wireless device is connected to a mobile network or a wifi network; the wifi connection also includes a connect indication indicating whether access is via mobile network or a fixed connection, with fixed being implicit unlimited quota. When sending the connection indication "mobile" we could add additional information indicating which mobile network type, e.g. 2G 3G or 4G, giving an estimate on the speed supported.

The wireless device 10 may also select an access network based on the indication/capacity indication. Based on whether the connection or subscription used has unlimited vs. limited data, the wireless device 10 may select to use first or second RAT e.g. WiFi or 2G/3G/4G access. For example, when WiFi with limited data vs. 4G with unlimited data e.g. different subscriptions are present, the wireless device 10 with its UICC and also the radio node 13 with a different UICC, may select 4G access. Other factors may be included on the wireless device 10 for basing the selection of the access network, e.g. speed or data throughput.

Figure 7:
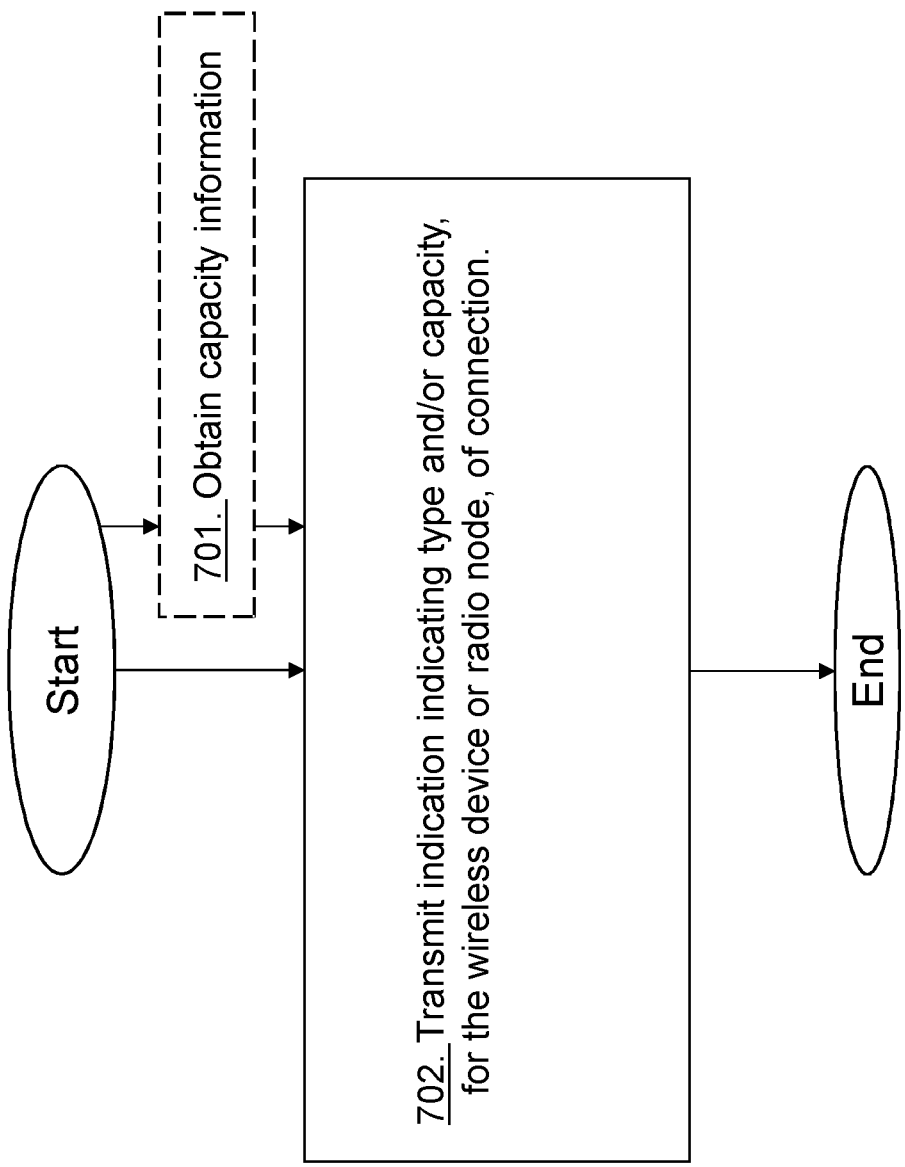
FIG. 7 is a flowchart depicting a method performed by an access network node according to embodiments herein.

The method actions performed by the access network node 12 for handling data communication of the service in the wireless communication network 1 according to some embodiments will now be described with reference to a flowchart depicted in FIG. 7. The actions do not have to be taken in the order stated below, but may be taken in any suitable order. Actions performed in some embodiments are marked with dashed boxes. The access network node 12 may provide radio coverage over the first service area 11 supporting the first RAT, and the radio node 13 may provide radio coverage over the second service area 14 supporting the second RAT. The first and second RATs may be different RATs. The first RAT may be a mobile network access and the second RAT be a Wi-Fi access or a Bluetooth access. The first RAT may be using a licensed frequency band and the second RAT may be using an unlicensed frequency band; or the first RAT may be using both licensed and unlicensed frequency spectrum and the second RAT may only be using the unlicensed frequency spectrum. The radio node 13 may communicate with the access network node 12 over the connection using resources allocated by the access network node 12.

Action 701. The access network node 12 may obtain capacity information from a network node in the core network. The capacity information may indicate capacity of a subscription for the wireless device 10 or for the radio node 13, e.g. indicate whether it is a subscription with a limited quota or not.

Action 702. The access network node 12 then transmits the indication to the wireless device 10 or to the radio node 13. The indication indicates type and/or capacity, for the wireless device or the radio node, of the connection between the radio node 13 and the access network node 12 or the connection between the wireless device 10 and the access network node 12. The indication transmitted may be a capacity indication indicating capacity of the subscription for the wireless device 10 or the radio node 13 e.g. indicating whether it is a subscription with a limited quota or not. Thus, the capacity indication may be same or similar as the indication sent from the radio node 13. The capacity indication may be associated with the radio node 13 e.g. mapped to an identity of the radio node 13. Thus, the wireless device 10 once detecting the radio node 13 may change to a policy based on the capacity indication.

Figure 8:
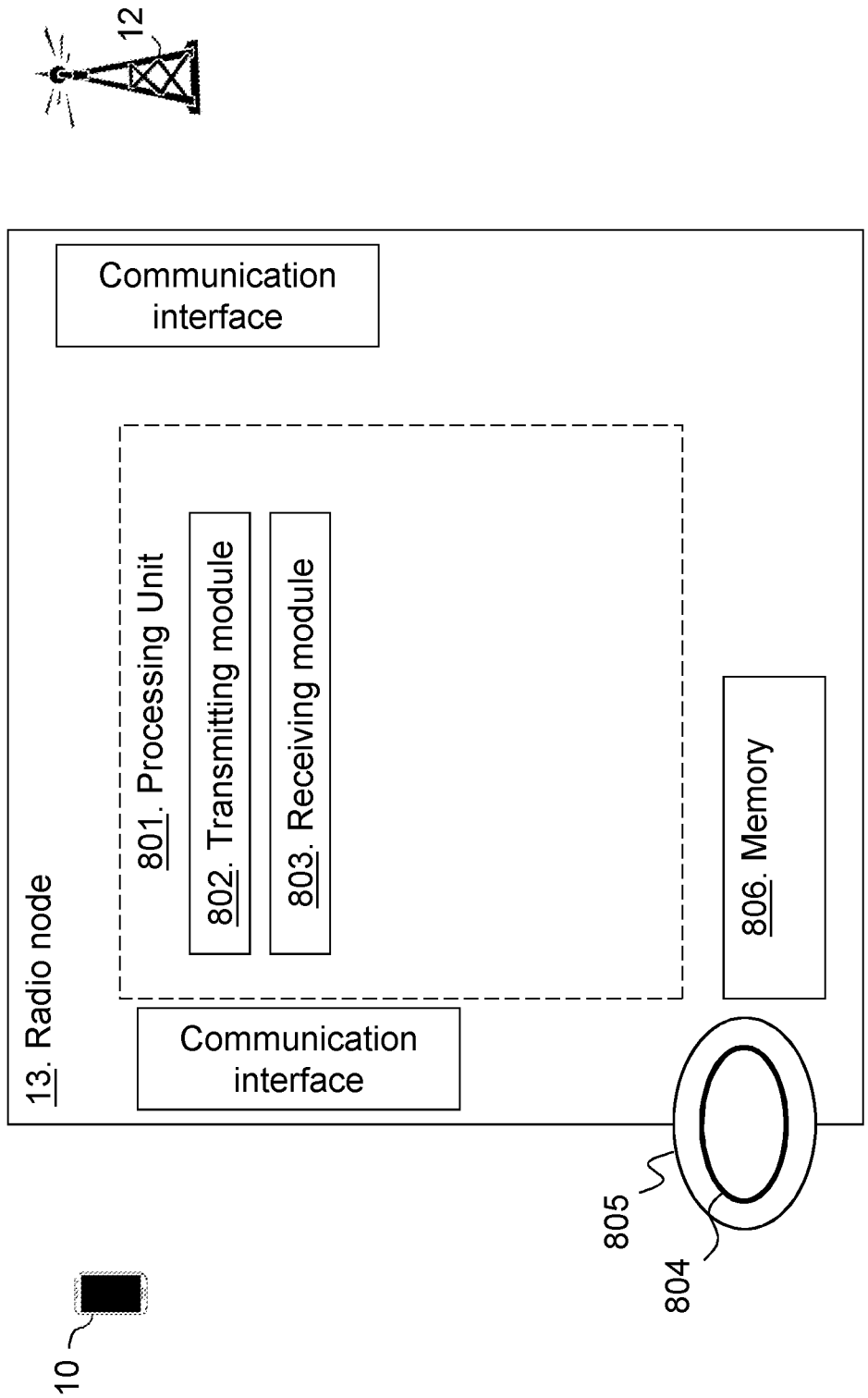
FIG. 8 is a block diagram depicting a radio node according to embodiments herein.

FIG. 8 is a block diagram depicting the radio node 13 for handling provision of the service to the wireless device 10 in the wireless communication network. The wireless communication network 1 comprises the access network node 12 serving the radio node 13 over the connection.

The radio node 13 may comprise a processing unit 801, e.g. one or more processors, being configured to perform the methods herein.

The radio node 13 may comprise a transmitting module 802. The radio node 13, the processing unit 801, and/or the transmitting module 802 may be configured to transmit the indication to the wireless device, which indication indicates type and/or capacity, for the wireless device 10 or the radio node 13, of the connection between the radio node 13 and the access network node 12. The indication may indicate whether the radio node 13 is connected to the access network node 12 over the connection with a limited quota of data or not. The indication may indicate whether the radio node 13 is connected to the access network node 12 over a wireless connection or a wired connection.

The radio node 13 may comprise a receiving module 803. The radio node 13, the processing unit 801, and/or the receiving module 803 may be configured to receive the connection request from the wireless device 10, and the radio node 13, the processing unit 801, and/or the transmitting module 802 may be configured to transmit the indication to the wireless device in the response to the connection request.

The access network node 12 may be configured to provide radio coverage over the first service area 11 supporting the first RAT and the radio node 13, the processing unit 801, and/or the transmitting module 802 may be configured to provide radio coverage over the second service area 14 supporting the second RAT, which first and second RATs are different RATs.

The methods according to the embodiments described herein for the radio node 13 are respectively implemented by means of e.g. a computer program 804 or a computer program product, comprising instructions, i.e., software code portions, which, when executed on at least one processor, cause the at least one processor to carry out the actions described herein, as performed by the radio node 13. The computer program 804 may be stored on a computer-readable storage medium 805, e.g. a disc or similar. The computer-readable storage medium 805, having stored thereon the computer program, may comprise the instructions which, when executed on at least one processor, cause the at least one processor to carry out the actions described herein, as performed by the radio node 13. In some embodiments, the computer-readable storage medium may be a non-transitory computer-readable storage medium.

The radio node 13 further comprises a memory 806 and communication interfaces. The memory comprises one or more units to be used to store data on, such as indications, radio resources, scheduling information, identities of wireless devices, context of wireless devices, applications to perform the methods disclosed herein when being executed, and similar.

Figure 9:
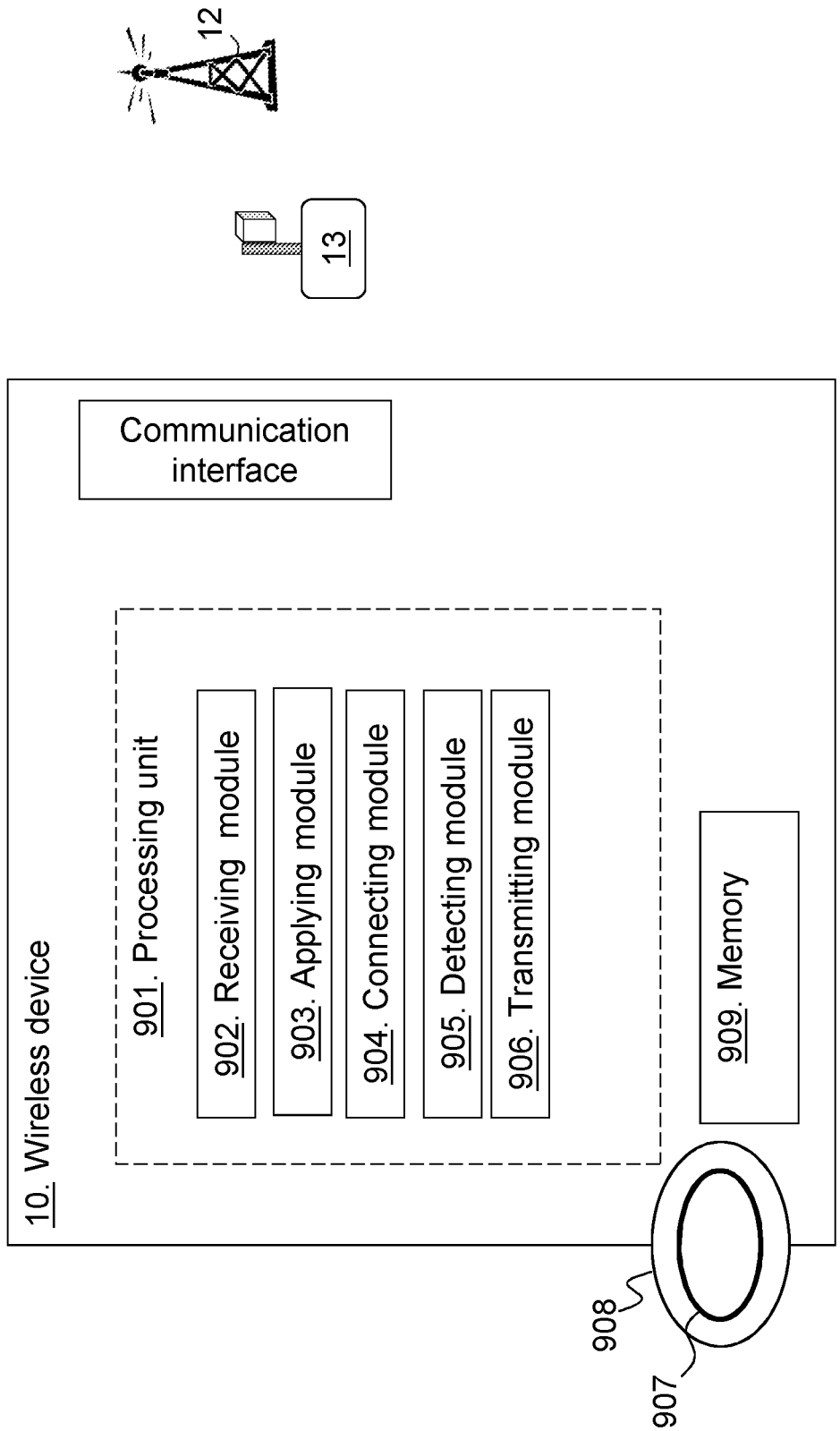
FIG. 9 is a block diagram depicting a wireless device according to embodiments herein.

FIG. 9 is a block diagram depicting the wireless device 10 for handling data communication of the service in the wireless communication network 1. The wireless communication network 1 comprises the radio node 13 and the access network node 12 serving the radio node 13 over the connection. The access network node 12 may be configured to provide radio coverage over the first service area 11 supporting the first RAT, and the radio node 13 may be configured to provide radio coverage over the second service area 14 supporting the second RAT, which first and second RATs may be different RATs.

The wireless device 10 may comprise a processing unit 901, e.g. one or more processors, being configured to perform the methods herein.

The wireless device 10 may comprise a receiving module 902. The wireless device 10, the processing unit 901, and/or the receiving module 902 may be configured to receive the indication from the radio node 13 or the access network node 12, which indication indicates type and/or capacity, for the wireless device or the radio node 13, of the connection between the radio node 13 and the access network node 12 or the connection between the wireless device and the access network node. The indication may indicate whether the radio node 13 is connected to the access network node 12 over a connection with a limited quota of data or not. The indication may indicate whether the radio node 13 is connected to the access network node 12 over a wireless connection or a wired connection. The wireless device 10, the processing unit 901, and/or the receiving module 902 may be configured to receive the indication from the access network node 12, e.g. a capacity indication. The capacity indication may be associated to the radio node 13 e.g. mapped to an identity of the radio node 13 or to the subscription of the wireless device 10. The wireless device 10, the processing unit 901, and/or the applying module 903 may be configured to use the capacity indication from the access network node 12 to apply a policy or select a policy based on the capacity indication. Hence, policy or polices are applied based on the indication/capacity indication.

The wireless device 10 may comprise an applying module 903. The wireless device 10, the processing unit 901, and/or the applying module 903 may be configured to apply a policy regarding data communication of the service based on the received indication.

The wireless device 10 may comprise a connecting module 904. The wireless device 10, the processing unit 901, and/or the connecting module 904 may be configured to connect to the first RAT.

The wireless device 10 may comprise a detecting module 905. The wireless device 10, the processing unit 901, and/or the detecting module 905 may be configured to detect the radio node 13.

The wireless device 10 may comprise a transmitting module 906. The wireless device 10, the processing unit 901, and/or the transmitting module 906 may be configured to transmit the connection request to the radio node 13. The wireless device 10, the processing unit 901, and/or the receiving module 902 may be configured to receive the indication from the radio node as the response to the connection request.

The current wireless devices prefer WiFi over 3G access, however, according to embodiments herein the wireless device 10, the processing unit 901, and/or the connecting module 904 may be configured to perform a selection of changing to connect to the radio node 13 based on the capacity indication or received indication indicating quota, e.g. if 3G connection to access network node 12 has unlimited data, and WiFi of radio node 13 offers limited data the wireless device 10 may select to stay on 3G.

The methods according to the embodiments described herein for the wireless device 10 are respectively implemented by means of e.g. a computer program 907 or a computer program product, comprising instructions, i.e., software code portions, which, when executed on at least one processor, cause the at least one processor to carry out the actions described herein, as performed by the wireless device 10. The computer program 907 may be stored on a computer-readable storage medium 908, e.g. a disc or similar. The computer-readable storage medium 908, having stored thereon the computer program, may comprise the instructions which, when executed on at least one processor, cause the at least one processor to carry out the actions described herein, as performed by the wireless device 10. In some embodiments, the computer-readable storage medium may be a non-transitory computer-readable storage medium.

The wireless device 10 further comprises a memory 909 and communication interfaces. The memory comprises one or more units to be used to store data on, such as indications, scheduling information, identities of radio nodes, policies, applications to perform the methods disclosed herein when being executed, and similar.

Figure 10:
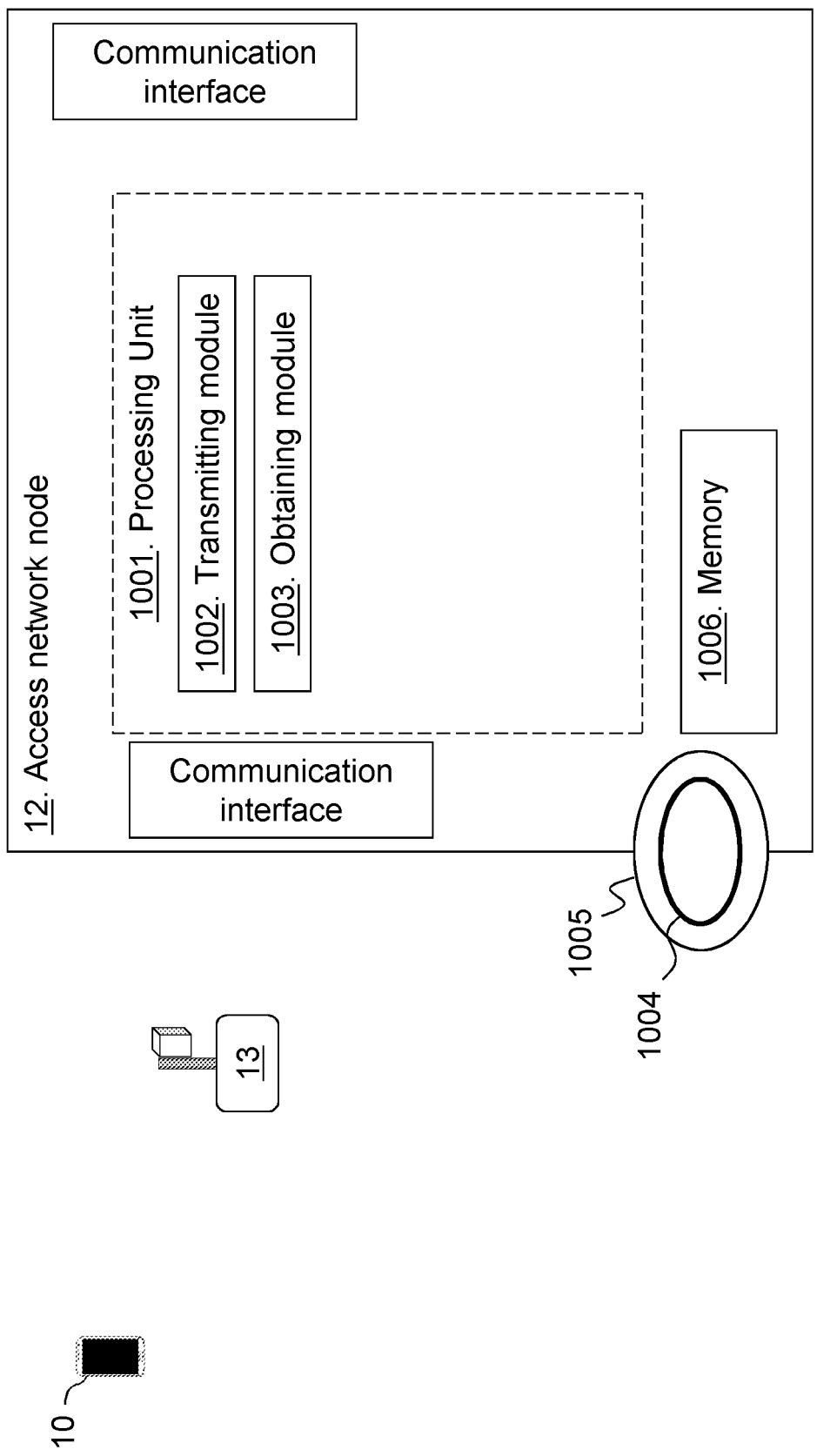
FIG. 10 is a block diagram depicting an access network node according to embodiments herein.

FIG. 10 is a block diagram depicting the access network node 12 for handling provision of the service to the wireless device 10 in the wireless communication network 1.

The access network node 12 may comprise a processing unit 1001, e.g. one or more processors, being configured to perform the methods herein.

The access network node 12 comprises a transmitting module 1002. The access network node 12, the processing unit 1001, and/or the transmitting module 1002 may be configured to transmit the indication to the wireless device 10 or to the radio node 13. The access network node 12 may know the radio node 13 and the wireless device 10 as separate devices with separate subscriptions and limitations of quota of data. The indication indicates type and/or capacity, for the wireless device or the radio node 13, of the connection between the radio node 13 and the access network node 12 or the connection between the wireless device 10 and the access network node 12. The indication may be a capacity indication indicating the capacity of the subscription for the wireless device 10 or the radio node 13. Thus, the capacity indication may be same or similar as the indication sent from the radio node 13 to the wireless device 10. The capacity indication may be associated with the radio node 13 e.g. mapped to an identity of the radio node 13. Thus, the wireless device 10 once detecting the radio node 13 may change to a policy based on the capacity indication.

The access network node 12 comprises an obtaining module 1003. The access network node 12, the processing unit 1001, and/or the obtaining module 1003 may be configured to obtain capacity information from the network node in the core network, which capacity information indicates the capacity of the subscription for the wireless device 10 or the radio node 13. The indication transmitted may be the capacity indication, which capacity indication indicates the capacity of the subscription for the wireless device or the radio node 13.

The methods according to the embodiments described herein for the access network node 12 are respectively implemented by means of e.g. a computer program 1004 or a computer program product, comprising instructions, i.e., software code portions, which, when executed on at least one processor, cause the at least one processor to carry out the actions described herein, as performed by the access network node 12. The computer program 1004 may be stored on a computer-readable storage medium 1005, e.g. a disc or similar. The computer-readable storage medium 1005, having stored thereon the computer program, may comprise the instructions which, when executed on at least one processor, cause the at least one processor to carry out the actions described herein, as performed by the access network node 12. In some embodiments, the computer-readable storage medium may be a non-transitory computer-readable storage medium.

The access network node 12 further comprises a memory 1006 and communication interfaces. The memory comprises one or more units to be used to store data on, such as subscription data, radio resources, scheduling information, identities of wireless devices, transmit power, applications to perform the methods disclosed herein when being executed, and similar.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a radio node for handling provision of a service to a wireless device in a wireless communication network, wherein the wireless communication network comprises an access network node serving the radio node over a connection, the method comprising:

transmitting an indication to the wireless device, wherein the indication separately indicates:
   a type of the connection between the radio node and the access network node; and
   a capacity of the connection between the radio node and the access network node, the capacity at least indicating whether the radio node is connected to the access network node over the connection with a limited quota of data or not.

2. The method according to claim 1, wherein the indication indicates whether the radio node is connected to the access network node over a wireless connection or a wired connection.

3. The method according to claim 1, further comprising: receiving a connection request from the wireless device and the indication is transmitted to the wireless device in a response to the connection request.

4. The method according to claim 1, wherein the access network node provides radio coverage over a first service area supporting a first radio access technology, RAT, and the radio node provides radio coverage over a second service area supporting a second RAT, wherein the first and second RATs are different RATs.

5. A method performed by a wireless device for handling data communication of a service in a wireless communication network, wherein the wireless communication network comprises a radio node and an access network node serving the radio node over a connection, the method comprising:
   receiving an indication from the radio node or from the access network node, wherein the indication separately indicates:
      a type of the connection between the radio node and the access network node; and
      a capacity of the connection between the radio node and the access network node, the capacity at least indicating whether the radio node is connected to the access network node over the connection with a limited quota of data or not; and
   applying a policy regarding data communication of the service based on the received indication.

6. The method according to claim 5, wherein the indication indicates whether the radio node is connected to the access network node over a wireless connection or a wired connection.

7. The method according to claim 5, wherein the wireless device is connected to a first radio access technology and further comprising:
   detecting the radio node; and
   transmitting a connection request to the radio node and the indication is received from the radio node as a response to the connection request.

8. The method according to claim 5, wherein the access network node provides radio coverage over a first service area supporting a first radio access technology, RAT, and the radio node provides radio coverage over a second service area supporting a second RAT, wherein the first and second RATs are different RATs.

9. A method performed by an access network node for handling provision of a service to a wireless device in a wireless communication network, wherein the wireless communication network comprises a radio node served by the access network node over a connection, the method comprising:
   transmitting an indication to the wireless device, wherein the indication separately indicates:
      a type of a connection between the radio node and the access network node; and
      a capacity of the connection between the radio node and the access network node, the capacity at least indicating whether the radio node is connected to the access network node over the connection with a limited quota of data or not.

10. The method according to claim 9, further comprising: obtaining capacity information from a network node in a core network, wherein the capacity information indicates a capacity of a subscription for the wireless device, wherein the indication from the radio node to the wireless device is based on the capacity information.

11. A radio node for handling provision of a service to a wireless device in a wireless communication network, wherein the wireless communication network comprises an access network node serving the radio node over a connection, the radio node comprising:
   a communication interface; and
   a processing unit associated with the communication interface and configured to transmit an indication to the wireless device, wherein the indication separately indicates:
      a type of the connection between the radio node and the access network node; and
      a capacity of the connection between the radio node and the access network node, the capacity at least indicating whether the radio node is connected to the access network node over the connection with a limited quota of data or not.

12. The radio node according to claim 11, wherein the indication indicates whether the radio node is connected to the access network node over a wireless connection or a wired connection.

13. The radio node according to claim 11, wherein the processing unit is further configured to receive a connection request from the wireless device, and to transmit the indication to the wireless device in a response to the connection request.

14. The radio node according to claim 11, wherein the access network node is configured to provide radio coverage over a first service area supporting a first radio access technology, RAT, and the radio node is configured to provide radio coverage over a second service area supporting a second RAT, wherein the first and second RATs are different RATs.

15. A wireless device for handling data communication of a service in a wireless communication network, wherein the wireless communication network comprises a radio node and an access network node serving the radio node over a connection, the wireless device comprising:
   a communication interface; and
   a processing unit associated with the communication interface and configured to:
      receive an indication from the radio node or from the access network node, wherein the indication separately indicates:
         a type of the connection between the radio node and the access network node; and
         a capacity of the connection between the radio node and the access network node, the capacity at least indicating whether the radio node is connected to the access network node over the connection with a limited quota of data or not; and
      apply a policy regarding data communication of the service based on the received indication.

16. The wireless device according to claim 15, wherein the indication indicates whether the radio node is connected to the access network node over a wireless connection or a wired connection.

17. The wireless device according to claim 15, wherein the processing unit is further configured to:

connect to a first radio access technology;

detect the radio node;

transmit a connection request to the radio node; and receive the indication from the radio node as a response to the connection request.

18. The wireless device according to claim 15, wherein the access network node is configured to provide radio coverage over a first service area supporting a first radio access technology, RAT, and the processing unit is further configured to provide radio coverage over a second service area supporting a second RAT, wherein the first and second RATs are different RATs.

19. An access network node for handling provision of a service to a wireless device in a wireless communication network, wherein the wireless communication network comprises a radio node served by the access network node over a connection, the access network node comprising:

a communication interface; and a processing unit associated with the communication interface and configured to transmit an indication to the wireless device, wherein the indication separately indicates:

a type of a connection between the radio node and the access network node; and a capacity of the connection between the radio node and the access network node, the capacity at least indicating whether the radio node is connected to the access network node over the connection with a limited quota of data or not.

20. The access network node according to claim 19, wherein the processing unit is further configured to obtain capacity information from a network node in a core network, wherein the capacity information indicates a capacity of a subscription for the wireless device, wherein the indication from the radio node to the wireless device is based on the capacity information.

21. The method according to claim 1, further comprising obtaining, from the access network node, a capacity indication that indicates a data quota of a subscription of the wireless device to the access network node, wherein the indication from the radio node to the wireless device is based on the capacity indication.

* * * * *